(12) United States Patent
Jeon (10) Patent No.: US 10,053,101 B2
(45) Date of Patent: Aug. 21, 2018

(54) DEVICE FOR CONTROLLING DRIVING MODE AND METHOD FOR CONTROLLING DRIVING MODE USING THE SAME

(71) Applicant: Hyundai Motor Company, Seoul (KR)

(72) Inventor: Byeong Wook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 505 days.

(21) Appl. No.: 14/929,843

(22) Filed: Nov. 2, 2015

(65) Prior Publication Data

US 2016/0375906 A1 Dec. 29, 2016

(30) Foreign Application Priority Data

Jun. 24, 2015 (KR) ........................ 10-2015-0089610

(51) Int. Cl.
*B60W 30/182* (2012.01)

(52) U.S. Cl.
CPC ....... *B60W 30/182* (2013.01); *B60W 2420/42* (2013.01); *B60W 2420/52* (2013.01); *B60W 2540/30* (2013.01); *B60W 2550/141* (2013.01); *B60W 2550/20* (2013.01); *B60W 2550/402* (2013.01); *B60W 2720/106* (2013.01)

(58) Field of Classification Search
CPC ......... B60W 30/182; B60W 2550/141; B60W 2550/20; B60W 2540/30; B60W 2720/106
See application file for complete search history.

(56) References Cited

U.S. PATENT DOCUMENTS 9,507,413 B2 * 11/2016 Gee ........................... G06F 3/01

FOREIGN PATENT DOCUMENTS

| JP | 2007-186141 A | 7/2007 |
|----|---------------|--------|
| JP | 2012-091563 A | 5/2012 |
| JP | 2013-126788 A | 6/2013 |
| KR | 10-2005-0027536 | 3/2005 |
| KR | 10-2014-0080640 A | 7/2014 |

\* cited by examiner

*Primary Examiner* — Erin D Bishop
(74) *Attorney, Agent, or Firm* — Mintz Levin Cohn Ferris Glovsky and Popeo, P.C.; Peter F. Corless (57) ABSTRACT

A method for controlling a driving mode of a vehicle using a device for controlling a driving mode is provided. The method includes collecting position information and forward road information of the vehicle and predicting whether the vehicle enters an acceleration section requiring acceleration by using the collected position information and forward road information of the vehicle. A driving mode of the vehicle is then changed when the vehicle is predicted to enter the acceleration section.

20 Claims, 8 Drawing Sheets

| Current driving mode | Long-term driving tendency | Traffic flow of main lane | Control mode when entering highway |
|---|---|---|---|
| Eco mode | Mild | Congested | Normal mode |
| | | Not congested | Sports mode |
| | Average | Congested | Normal mode |
| | | Not congested | Sports mode |
| | Sporty | Congested | Sports mode |
| | | Not congested | Sports mode |
| Normal mode | Mild | Congested | Normal mode |
| | | Not congested | Sports mode |
| | Average | Congested | Sports mode |
| | | Not congested | Sports mode |
| | Sporty | Congested | Sports mode |
| | | Not congested | Sports mode |
| Sports mode | Any | Any | Sports mode |

FIG. 5

RELATED ART

FIG. 6

RELATED ART

DEVICE FOR CONTROLLING DRIVING MODE AND METHOD FOR CONTROLLING DRIVING MODE USING THE SAME

CROSS-REFERENCE TO RELATED APPLICATION

This application claims priority to and the benefit of Korean Patent Application No. 10-2015-0089610 filed in the Korean Intellectual Property Office on Jun. 24, 2015, the entire contents of which are incorporated herein by reference.

BACKGROUND (a) Field of the Invention

The present invention relates to a device for controlling a driving mode, and a method for controlling a driving mode using the same, and more specifically, relates to a device for controlling a driving mode of a vehicle to switch an acceleration mode when entering a highway, and a method for controlling a driving mode using the same.

(b) Description of the Related Art

Typically, a vehicle is driven based on a general shift pattern and how an engine torque response mode is configured. In addition, when entering a high speed traffic section such as a highway, a sudden acceleration operation is required to match (e.g., accelerate up to a speed of traffic) a traffic flow before joining a main highway lane. However, the vehicle's reaction is generally slow to satisfy driver intention of acceleration when sudden acceleration is executed to merge in a flow of vehicles upon entering the highway.

Such a vehicle reaction is due to conventional driving in a normal mode or an eco-mode not considering sudden acceleration conditions and thus, to solve this problem, the driver experiences inconvenience of manipulating a shift button to a sports mode to change a driving mode whenever entering the highway. As described above, the driver has difficulty in manipulating a button for switching to the sports mode to change the driving mode while driving, and experiences inconvenience of switching back to the normal mode from the driving mode when driving at a more constant speed after joining a main highway lane.

The above information disclosed in this section is merely to enhance the understanding of the background of the invention, and therefore it may contain information that does not form the prior art that is already known in this country to a person of ordinary skill in the art.

SUMMARY

The present invention provides a device for controlling a driving mode of a vehicle to switch to an acceleration mode when entering a highway, and a method for controlling a driving mode using the same.

A method for controlling a driving mode of a vehicle using a device for controlling a driving mode that collects position information and forward road information of the vehicle may include: predicting whether the vehicle enters an acceleration section requiring acceleration using the collected position information and forward road information of the vehicle; and executing a change of a driving mode of the vehicle when the vehicle is predicted to enter the acceleration section. The prediction of whether the vehicle enters the acceleration section may include determining that the vehicle enters the acceleration section when the vehicle enters a highway.

The driving mode may include: a normal mode as a general driving mode; an eco-mode having worse acceleration performance than the normal mode to reduce fuel consumption; and a sports mode having better acceleration performance than the normal mode. The execution of a change in the driving mode may include determining to change the driving mode by considering driving tendency of a driver or a traffic flow of the acceleration section. Additionally, the execution of the change of the driving mode may include automatically switching from the normal mode to the sports mode when the current driving mode is the normal mode and the driving tendency of the driver is equal to or greater than an average driving tendency, switching to the normal mode when the current driving mode is the eco mode and entering the highway is predicted, and switching to the sports mode when the traffic flow on the highway is not congested (e.g., ample room for the vehicle to enter the highway lanes thus not requiring a stop before entering the highway).

A device for controlling a driving mode of the present invention may include: a collecting unit configured to collect position information and forward road information of a vehicle; a predicting unit configured to predict whether the vehicle enters an acceleration section requiring acceleration of the vehicle using the collected position information of the vehicle and forward road information; and a controller configured to execute a change of the driving mode of the vehicle when the vehicle is predicted to enter the acceleration section.

The collecting unit may be configured to collect the position information of the vehicle or the forward road information via at least one of a navigation device, an imaging device (e.g., a camera, video camera, or the like), and a radar installed within the vehicle. The predicting unit may include an acceleration section predicting unit configured to predict the vehicle entering the acceleration section when the vehicle enters a highway. The controller may include driving tendency determining unit configured to determine driving tendency of a driver, and a traffic flow determining unit configured to determine a traffic flow of the acceleration section. The controller may further include a driving mode determining unit configured to determine to change the driving mode by considering the driving tendency of the vehicle driver and the traffic flow of the acceleration section.

The driving mode may include: a normal mode as a general driving mode; an eco-mode having worse acceleration performance than the normal mode to reduce fuel consumption; and a sports mode having better acceleration performance than the normal mode. The driving tendency of the driver may be determined by a sporty index in which a change in the vehicle speed or an accelerator pedal position is considered, and may include a first tendency having a low sporty index, a second tendency having an average sporty index, and a third tendency having a high sporty index.

The driving mode determining unit may be configured to automatically switch the current driving mode to the sports mode when the current driving mode of the vehicle is the normal mode and the driving tendency of the driver is the second or third tendency. The driving mode determining unit may further be configured to automatically switch to the normal mode when the current driving mode of the vehicle is an eco-mode and entering the highway is predicted, and may then switch from the normal mode to the sports mode when the traffic flow on the highway is not congested.

According to the present invention, an environment for improving acceleration performance may be provided by predicting the vehicle's highway entry, considering the driving tendency of the driver and the traffic flow, and then automatically switching the driving mode to the acceleration mode.

BRIEF DESCRIPTION OF THE DRAWINGS

The objects, features and advantages of the present invention will be more apparent from the following detailed description in conjunction with the accompanying drawings, in which.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numerals designate like elements throughout the specification.

Terms such as "vehicle", "car", "of a vehicle", and "automobile" or other similar terms used in this specification include vehicles including passenger vehicles including sports utility vehicles (SUVs), buses, trucks, and various commercial vehicles, vessels including various kinds of boats and ships, airplanes, and similarities thereof, and include hybrid vehicles, electric vehicles, plug-in hybrid electric vehicles, fuel cell electric vehicles, and other alternative fuel (e.g., fuel obtained from resources other than oil) vehicles. As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. In addition, some methods may be executed by at least one controller. The term "controller" or "control unit" refers to a hardware device including a memory and a processor configured to execute one or more steps interpreted as an algorithm structure. The memory stores algorithm steps, and the processor specifically executes the algorithm steps to perform one or more processes to be described below.

Further, a control logic of the present invention may be implemented by a non-transient computer-readable medium on a computer-readable means including executable program instructions executed by a processor, a controller, or the like. Examples of a computer-readable medium, although not restrictive, include ROMs, RAMs, CD-ROMs, magnetic tapes, floppy disks, flash drives, smart cards, and optical data storages. The computer-readable recording medium may be distributed in a network-connected computer system, and for example, may be stored and executed in a distributed manner by a telematics server or Controller Area Network (CAN).

A device for controlling a driving mode according to an exemplary embodiment of the present invention and a method for controlling a driving mode using the same will now be described in detail with reference to FIGS. 1 to 8.

Figure 1:
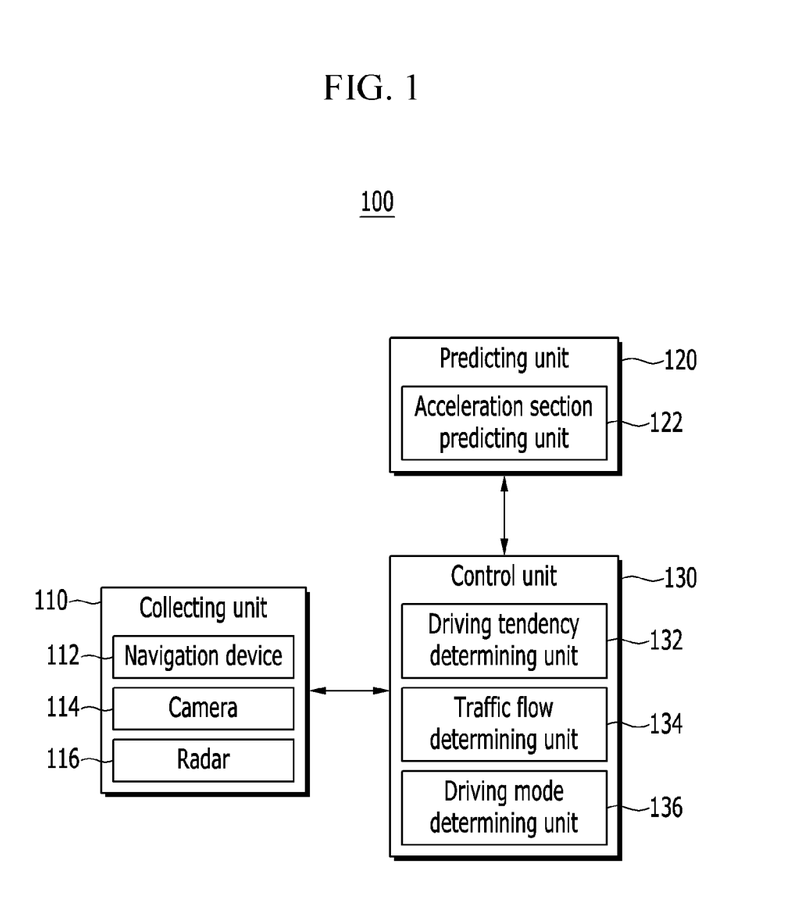
FIG. 1 is a view of a structure of a device for controlling a driving mode of a vehicle according to an exemplary embodiment of the present invention.

FIG. 1 is a view of a structure of a device for controlling a driving mode of a vehicle according to an exemplary embodiment of the present invention. The device for controlling a driving mode of a vehicle illustrates only a schematic configuration that is needed to describe the exemplary embodiment of the present invention, so it is not limited to such a configuration.

Referring to FIG. 1, the device 100 for controlling a driving mode according to the exemplary embodiment of the present invention may include a collecting unit 110, a predicting unit 120, and a controller 130. The controller 130 may be configured to execute the various units. In particular, the collecting unit 110 (e.g., a sensor or the like) may be configured to collect position information and forward road information of a vehicle. In addition, the collecting unit 110 may include a battery navigation device 112, an imaging device 114 (e.g., a camera, video camera, or the like), and a radar 116. The collecting unit 110 may be configured to collect the position information and the forward road information of the vehicle using the navigation device 112. Further, the collecting unit 110 may be configured to collect the position information and the forward road information of the vehicle using the imaging device 114 and the radar 116, as well as the navigation device 112.

The device 100 for controlling a driving mode according to the exemplary embodiment of the present invention may be configured to determine whether the vehicle is on a highway by using the collected position information and forward road information of the vehicle and may be configured to determine whether a road ahead is congested. The predicting unit 120 may be configured to predict whether the vehicle enters an acceleration section requiring acceleration by using the collected position information and forward road information of the vehicle.

In addition, according to the exemplary embodiment of the present invention, the predicting unit 110 may include an acceleration section predicting unit 122. When the vehicle enters the highway, the acceleration section predicting unit 122 may be configured predict that the vehicle enters the acceleration section. The controller 130 may be configured to change a driving mode of the vehicle when the vehicle is predicted to enter the highway representing the acceleration section. Particularly, the driving mode may include: a normal mode as a general driving mode; an eco-mode having worse acceleration performance than the normal mode to reduce fuel consumption; and a sports mode having better acceleration performance than the normal mode.

According to the exemplary embodiment of the present invention, the controller 130 may include a driving tendency determining unit 132, a traffic flow determining unit 134, and a driving mode determining unit 136. The driving tendency determining unit 132 may be configured to determine a driving tendency of a driver and the driving tendency of the driver may be determined by a sporty index in which a change in the vehicle speed or an accelerator pedal position is reflected. The driving tendency of the driver may include a first tendency having a low sporty index (hereinafter referred to as mild tendency), a second tendency having an average sporty index (hereinafter referred to as average tendency), and a third tendency having a high sporty index (hereinafter referred to as sporty tendency).

The traffic flow determining unit 134 may be configured to determine a traffic flow on the highway that the vehicle enters. For example, the traffic flow determining unit 134 may be configured to determine whether the traffic flow on the highway is congested. Additionally, the driving mode determining unit 136 may be configured to determine whether the driving mode needs to be changed by considering the driving tendency of the vehicle driver and the traffic flow on the highway. The controller 130 may be configured to switch from the normal mode to the sports mode when the current driving mode of the vehicle is the normal mode and the driving tendency of the driver is the second or third tendency which is equal to or greater than an average driving tendency.

When the current driving mode of the vehicle is the eco mode, the controller 130 may be configured to automatically switch the driving mode to the normal mode when entering the highway is predicted. When the traffic flow on the highway is not congested (e.g., a stop is not required to enter onto the highway), the controller 130 may be configured to switch from the normal mode to the sports mode. For this purpose, the controller 130 may be implemented by one or more processors operated by a predetermined program, and the predetermined program may be programmed to perform each step of a method for controlling a driving mode according to an exemplary embodiment of the present invention.

Figure 2:
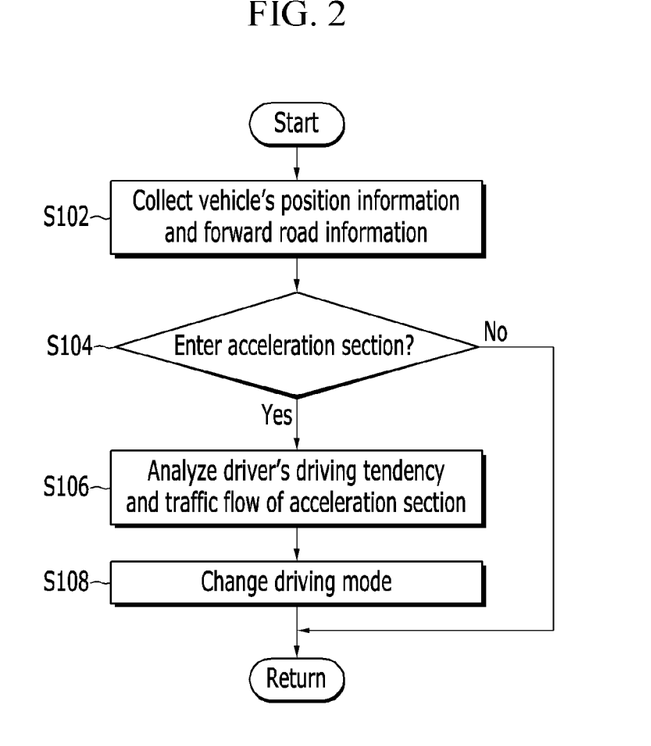
FIG. 2 is a flowchart schematically illustrating a process of changing a driving mode of a vehicle by the device for controlling a driving mode according to the exemplary embodiment of the present invention.

FIG. 2 is a flowchart schematically illustrating a process of changing a driving mode of a vehicle by the device for controlling a driving mode according to the exemplary embodiment of the present invention. The flowchart will be described using the same reference numerals in connection with the configuration of FIG. 1. Referring to FIG. 2, a device 100 for controlling a driving mode according to the exemplary embodiment of the present invention may be configured to collect position information and forward road information of a vehicle using a navigation device 112 (S102).

Next, the device 100 for controlling a driving mode may be configured to predict whether the vehicle enters an acceleration section by using the collected position information and forward road information (S104). When the vehicle enters the acceleration section, the device 100 may be configured to analyze driving tendency of a driver and a traffic flow of the acceleration section (S106). The device 100 may then be configured to change a driving mode of the vehicle by considering the driving tendency of the driver and the traffic flow of the acceleration section (S108).

Figure 3:
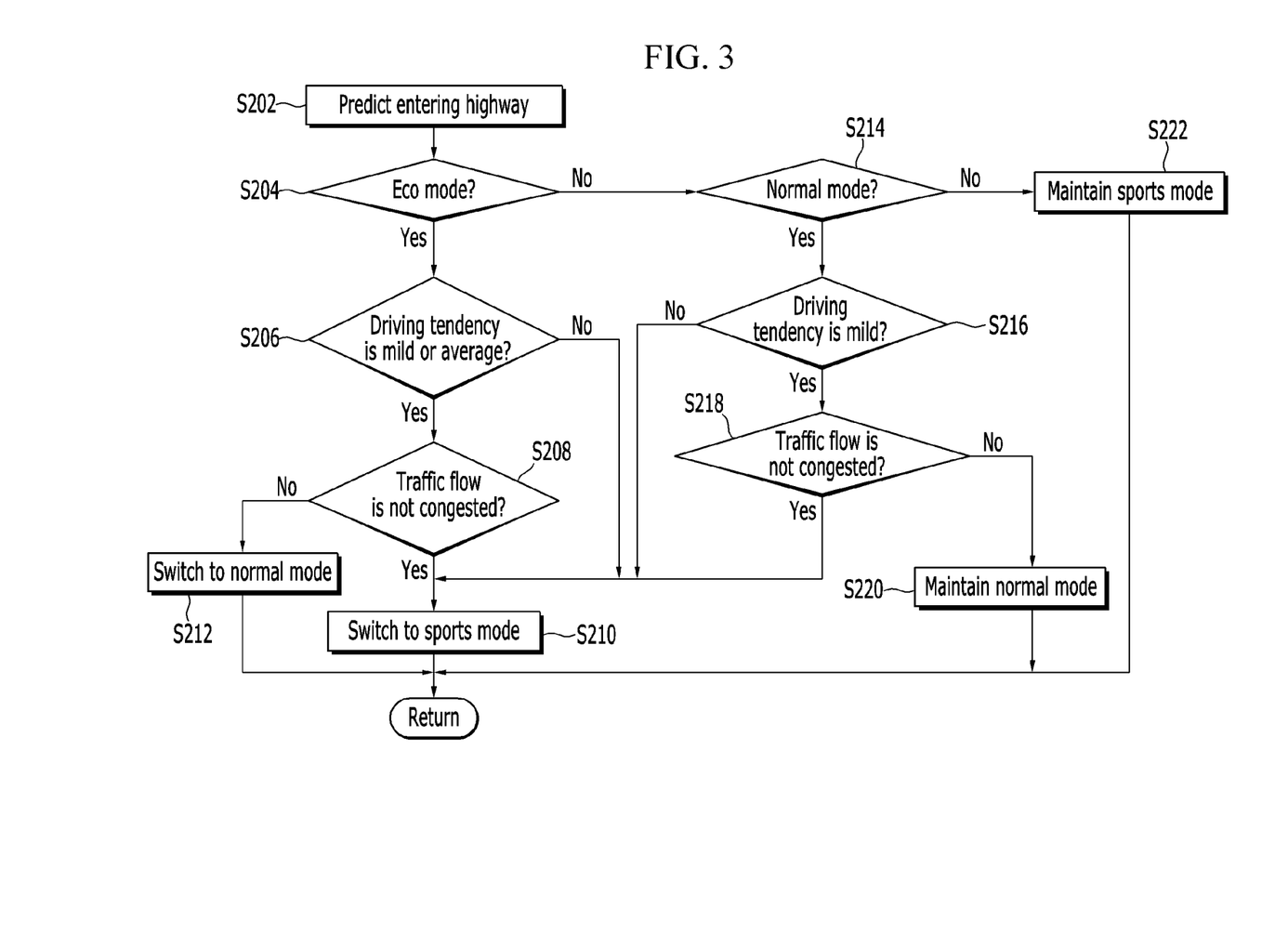
FIG. 3 is a detailed flowchart illustrating a process of changing a driving mode of a vehicle according to an exemplary embodiment of the present invention by considering driving tendency of a driver and a traffic flow.

FIG. 3 is a detailed flowchart illustrating a process of changing a driving mode of a vehicle by considering driving tendency of a driver and a traffic flow in accordance with an exemplary embodiment of the present invention. The following flowchart will be described using the same reference numerals in connection with the configuration of FIG. 1. Referring to FIG. 3, a device 100 for controlling a driving mode according to the exemplary embodiment of the present invention may be configured to predict whether a vehicle enters a highway or not (S202).

When a driving mode of the vehicle is an eco-mode, the device 100 may be configured to switch from the eco mode to a sports mode when the driving tendency of a driver is a mild or average tendency and a traffic flow on the highway is not congested (S204 to S210). In particular, the device 100 may be configured to switch from the eco mode to the sports mode regardless of the traffic flow when the driving tendency of the driver is the sporty tendency. Next, when the driving mode of the vehicle is the eco mode, the device 100 may be configured to switch from the eco mode to a normal mode when the driving tendency of the driver is a mild or average tendency and the traffic flow is congested (S212).

Further, when the driving mode of the vehicle is the normal mode, the device 100 may be configured to switch from the normal mode to the sports mode when the driving tendency is the mild tendency and the traffic flow on the highway is not congested (S214 to S218). In addition, when the driving mode of the vehicle is the normal mode, the device 100 may be configured to switch from the normal mode to the sports mode when the driving tendency of the driver is the average or sporty tendency. The device 100 may be configured to maintain the normal mode when the driving tendency is the mild tendency and the traffic flow is congested (S220). In addition, when the driving mode of the vehicle is the sports mode, the device 100 may be configured to maintain the sports mode regardless of the driving tendency and the traffic flow (S222).

Figure 4:
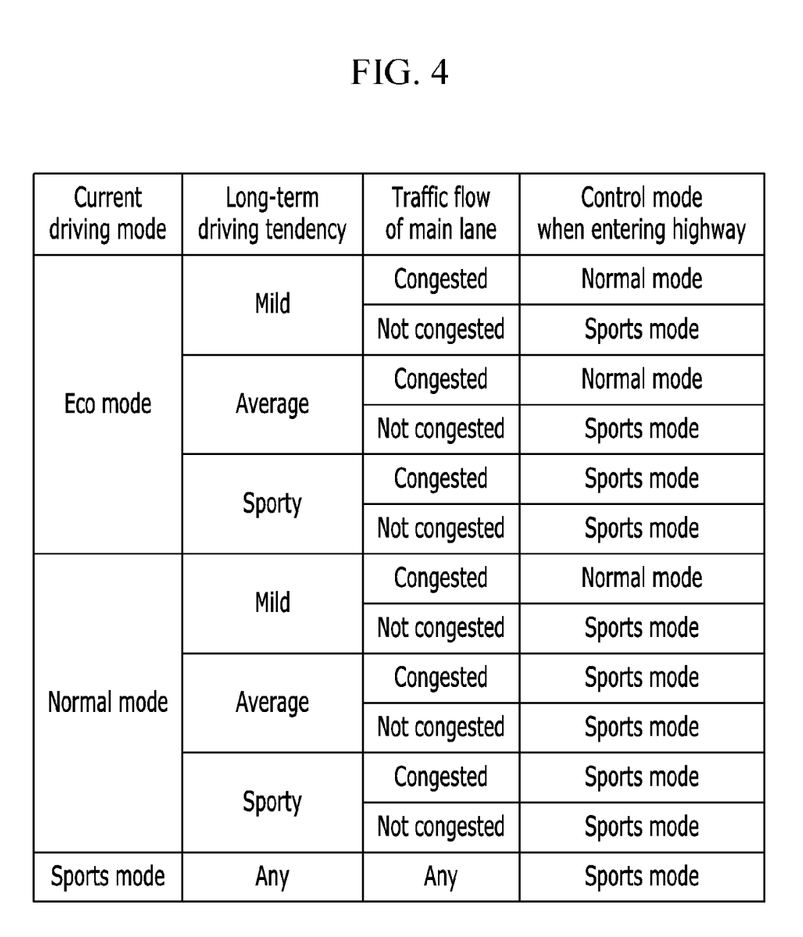
FIG. 4 is a table showing examples of changing a driving mode of a vehicle by considering driving tendency of a driver and a traffic flow in accordance with an exemplary embodiment of the present invention.

FIG. 4 is a table showing examples of changing a driving mode of a vehicle by considering driving tendency of a driver and a traffic flow in accordance with an exemplary embodiment of the present invention. As shown in FIG. 4, a device 100 for controlling a driving mode according to the exemplary embodiment of the present invention may be configured to change a driving mode by considering driving tendency of a driver and a traffic flow of a main highway lane when entering a highway.

Figure 5:
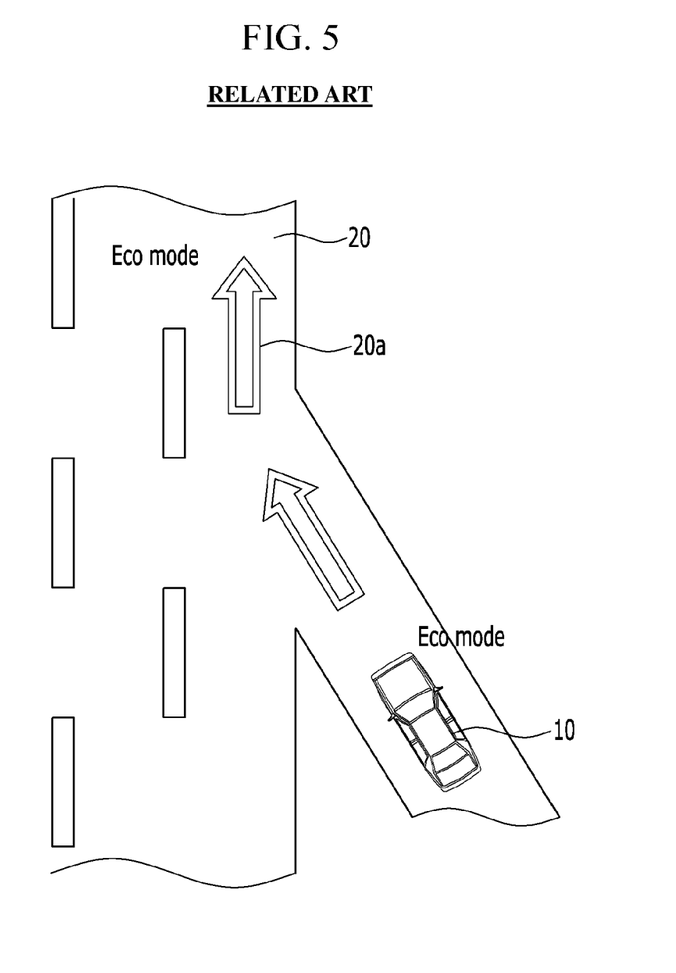
FIG. 5 illustrates an example of entering a highway in an eco-mode according to the related art.
Figure 6:
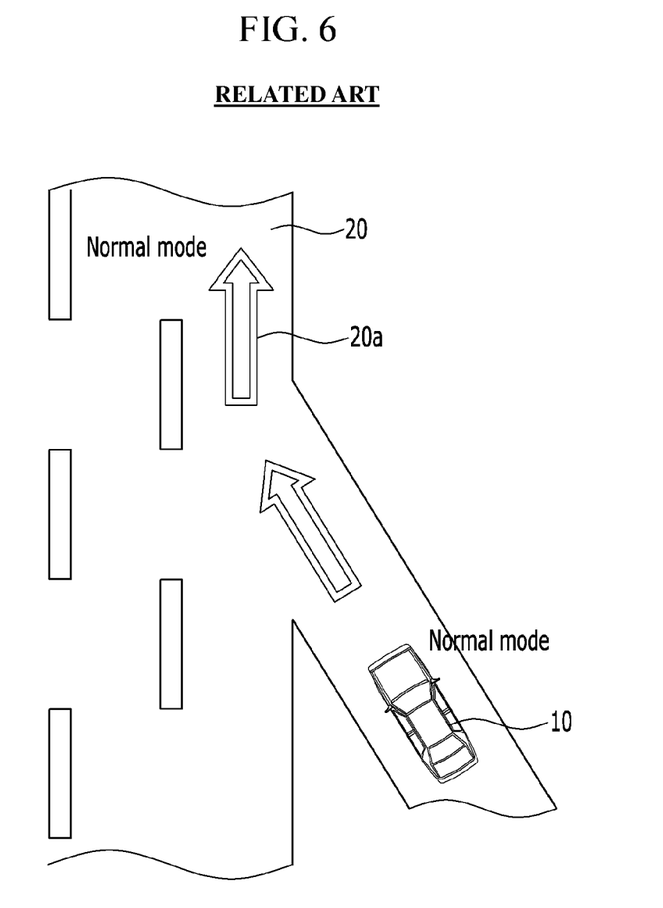
FIG. 6 illustrates an example of entering a highway in a normal mode according to the related art.

FIG. 5 illustrates an example of entering a highway in an eco-mode according to the related art, and FIG. 6 illustrates an example of entering a highway in a normal mode according to the related art. In the related art as shown in FIG. 5, when a driving mode of a vehicle 10 is an eco-mode when entering a highway 20, the eco mode is maintained even in an acceleration section 20a. Further, in the related art as shown in FIG. 6, when the driving mode of the vehicle 10 is a normal mode when entering the highway 20, the normal mode is maintained even in the acceleration section 20a. Accordingly, in the related art, when sudden acceleration is performed to merge in a flow of vehicles when entering the highway, reaction of the vehicle has been too slow to match the driver intention of acceleration.

Figure 7:
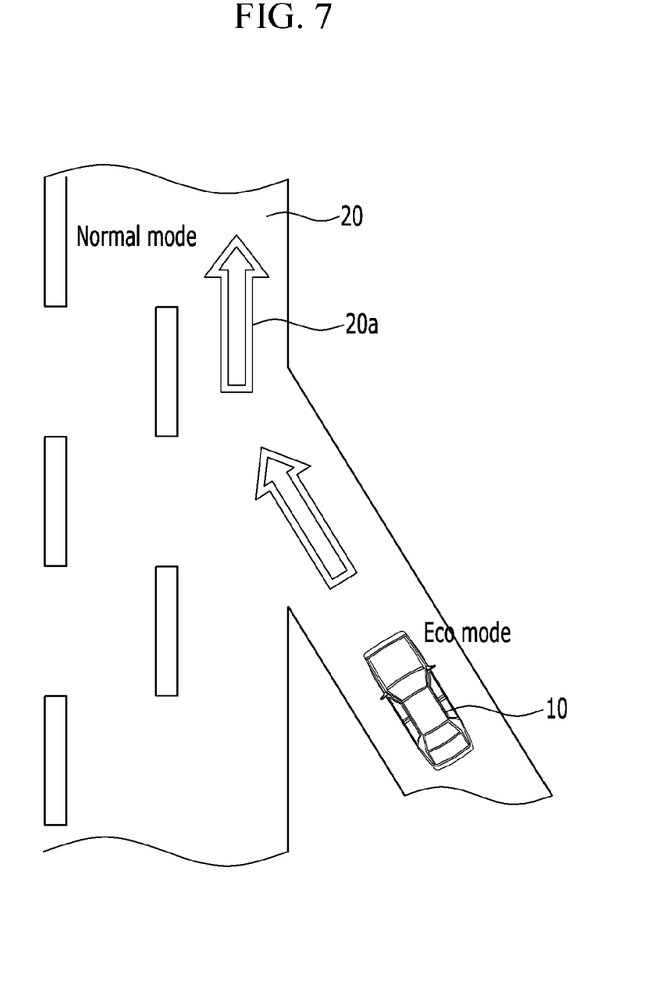
FIG. 7 illustrates an example of switching a driving mode from an eco-mode to a normal mode according to an exemplary embodiment of the present invention.
Figure 8:
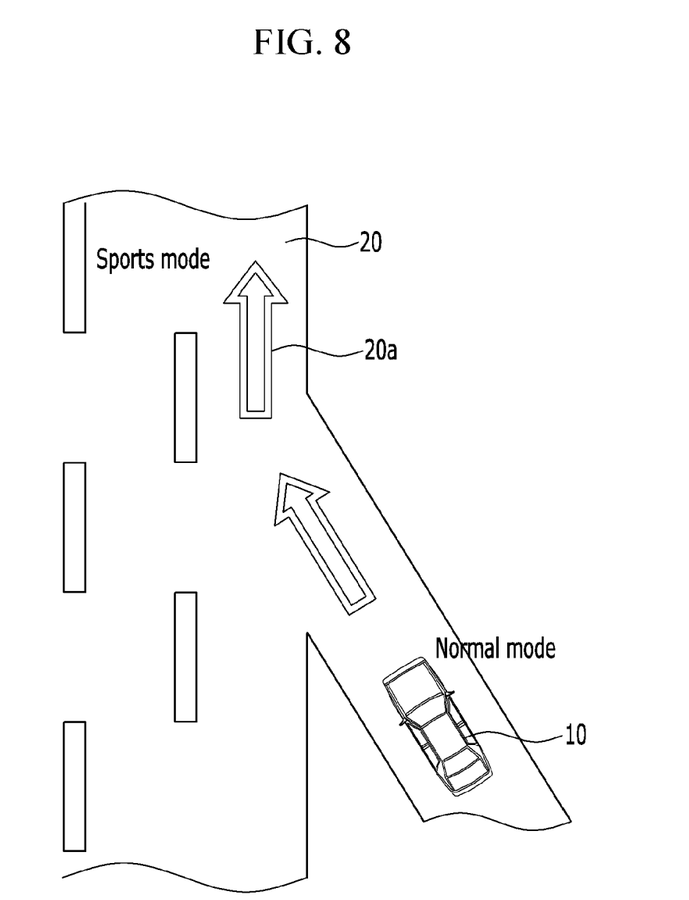
FIG. 8 illustrates an example of changing a driving mode from a normal mode to a sports mode according to an exemplary embodiment of the present invention.

FIG. 7 illustrates an example of changing a driving mode from an eco-mode to a normal mode according to an exemplary embodiment of the present invention, and FIG. 8 illustrates an example of changing a driving mode from a normal mode to a sports mode according to an exemplary embodiment of the present invention. As shown in FIG. 7, when a vehicle 10 enters a highway 20 in an eco-mode, a device 100 for controlling a driving mode according to the exemplary embodiment of the present invention may be configured to operate the vehicle 10 to switch to a normal mode in an acceleration section 20a of a highway 20. In addition, when the vehicle 10 enters the highway 20 in the normal mode as shown in FIG. 8, the device 100 may be configured to operate the vehicle 10 to switch to a sports mode in the acceleration section 20a of the highway 20.

As described above, the device 100 for controlling a driving mode according to the exemplary embodiment of the present invention provides an environment for improving acceleration performance by predicting whether the vehicle enters the highway, considering the driving tendency of the driver and the traffic flow, and then automatically switching the driving mode to the acceleration mode.

The foregoing exemplary embodiments of the present invention are not implemented only by an apparatus and a method, and therefore may be realized by programs realizing functions corresponding to the configuration of the exemplary embodiment of the present invention or recording media on which the programs are recorded. Such recording media may be executed in a user terminal as well as a server.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a driving mode of a vehicle using a device for controlling the driving mode, comprising:
    collecting, by a controller, position information and forward road information of the vehicle;
    predicting, by the controller, whether the vehicle enters an acceleration section requiring acceleration by using the collected position information and forward road information of the vehicle; and
    changing, by the controller, the driving mode of the vehicle when the vehicle is predicted to enter the acceleration section.

2. The method of claim 1, wherein predicting whether the vehicle enters the acceleration section includes determining, by the controller, that the vehicle enters the acceleration section when the vehicle enters a highway.

3. The method for controlling the driving mode of claim 2, wherein the driving mode includes: a normal mode as a general driving mode, an eco-mode having worse acceleration performance than the normal mode to reduce fuel consumption, and a sports mode having better acceleration performance than the normal mode.

4. The method of claim 3, wherein changing the driving mode includes determining, by the controller, to change the driving mode by considering driving tendency of a driver of the vehicle or a traffic flow of the acceleration section.

5. The method of claim 4, wherein changing the driving mode includes automatically switching, by the controller, from the normal mode to the sports mode when the current driving mode is the normal mode and the driving tendency of the driver is equal to or greater than an average driving tendency.

6. The method of claim 4, wherein changing the driving mode includes switching, by the controller, to the normal mode when the current driving mode is the eco mode and entering the highway is predicted, and switching, by the controller, to the sports mode when the traffic flow on the highway is not congested.

7. A device for controlling a driving mode, comprising:
    a memory configured to store program instructions; and
    a processor configured to execute the program instructions, the program instructions when executed configured to:
    collect position information and forward road information of a vehicle;
    predict whether the vehicle enters an acceleration section requiring acceleration of the vehicle by using the collected position information of the vehicle and the collected forward road information; and
    change the driving mode of the vehicle when the vehicle is predicted to enter the acceleration section.

8. The device of claim 7, wherein the program instructions when executed are further configured to collect the position information of the vehicle or the forward road information using at least one of a navigation device, an imaging device, and a radar installed within the vehicle.

9. The device of claim 8, wherein the program instructions when executed are further configured to predict the vehicle entering the acceleration section when the vehicle enters a highway.

10. The device of claim 9, wherein the program instructions when executed are further configured to determine driving tendency of a driver and a traffic flow of the acceleration section.

11. The device of claim 10, wherein the program instructions when executed are further configured to determine to change the driving mode by considering the driving tendency of the vehicle driver and the traffic flow of the acceleration section.

12. The device of claim 11, wherein the driving mode includes: a normal mode as a general driving mode; an eco-mode having worse acceleration performance than the normal mode to reduce fuel consumption; and a sports mode having better acceleration performance than the normal mode.

13. The device of claim 12, wherein the driving tendency of the driver is determined by a sporty index in which a change in a vehicle speed or an accelerator pedal position is considered, and includes a first tendency having the low sporty index, a second tendency having the average sporty index, and a third tendency having the high sporty index.

14. The device of claim 13, wherein the program instructions when executed are further configured to automatically switch the current driving mode to the sports mode when the current driving mode of the vehicle is the normal mode and the driving tendency of the driver is the second or third tendency.

15. The device of claim 13, wherein the program instructions when executed are further configured to automatically switch to the normal mode when the current driving mode of the vehicle is an eco-mode and entering the highway is predicted, and switch from the normal mode to the sports mode when the traffic flow on the highway is not congested.

16. A non-transitory computer readable medium containing program instructions executed by a controller, the computer readable medium comprising:
   program instructions that collect position information and forward road information of a vehicle;
   program instructions that predict whether the vehicle enters an acceleration section requiring acceleration of the vehicle by using the collected position information of the vehicle and the collected forward road information; and
   program instructions that change a driving mode of the vehicle when the vehicle is predicted to enter the acceleration section.

17. The non-transitory computer readable medium of claim 16, further comprising:
   program instructions that collect the position information of the vehicle or the forward road information using at least one of a navigation device, an imaging device, and a radar installed within the vehicle.

18. The non-transitory computer readable medium of claim 17, further comprising:
   program instructions that predict the vehicle entering the acceleration section when the vehicle enters a highway.

19. The non-transitory computer readable medium of claim 18, further comprising:
   program instructions that determine driving tendency of a driver and a traffic flow of the acceleration section.

20. The non-transitory computer readable medium of claim 18, further comprising:
   program instructions that determine to change the driving mode by considering the driving tendency of the vehicle driver and the traffic flow of the acceleration section.

* * * * *